Oct. 12, 1965 M. SCHWARTZ ETAL 3,211,054

CARTRIDGE FOR FILM AND TAPE

Original Filed March 26, 1958

INVENTORS
MORRIS SCHWARTZ
WILLIAM CASTEDELLO
BY Hane and Nydick
ATTORNEYS

United States Patent Office 3,211,054

Patented Oct. 12, 1965

3,211,054
CARTRIDGE FOR FILM AND TAPE

Morris Schwartz, Plainville, Conn., and William Castedello, Treasure Island, Fla., assignors to the Kalart Company Inc., Plainville, Conn.

Original application Mar. 26, 1958, Ser. No. 724,064, now Patent No. 3,033,077, dated May 8, 1962. Divided and this application Apr. 27, 1962, Ser. No. 190,688
8 Claims. (Cl. 88—28)

This is a division of application Ser. No. 724,064 filed Mar. 26, 1958, issued as Patent No. 3,033,077 on May 8, 1962.

The invention relates to a carrier for a supply of film and to a carrier for magnetic tape for use with sound projectors for the projection of successive still pictures formed on a strip of film and for simultaneous audible reproduction of recorded messages recorded on tape and each pertaining to one of said pictures; and more particularly, for use with sound projectors in which the picture projecting equipment and the sound reproducing equipment are incorporated in a common housing.

It is a broad object of the invention to provide for use with sound projectors of the general kind above referred to, a novel and improved cartridge in which a strip of film bearing the pictures to be projected and a magnetic tape carrying the recorded messages are accommodated and which can be inserted in and withdrawn from the projector. Ssuch positive correlation of the film and the sound track tape associated therewith in a common cartridge affords the advantage that any danger of confusion of pictures and associated messages on the part of the operator is eliminated.

It affords the further advantage that one presentation can be rapidly and conveniently exchanged for another by simply inserting another cartridge.

A specific object of the invention is to provide a novel and improved cartridge which accommodates a magnetic tape in the form of an endless loop and the strip of film bearing the pictures to be projected, and which, when inserted in the projector, is automatically positioned for coaction with the projection and reproduction equipment thereof. The use of tape in the form of an endless loop obviates the necessity of rewinding the tape at the end of each presentation.

Another specific object of the invention is to provide a novel and improved cartridge in which the rather sensitive emulsion side of the film is protected against scuffing and which prevents a slipping of the film into the cartridge when the film is rewound or first inserted thereby facilitating readying of the projector for a presentation.

Other and further objects, features and advantages of the invention will be pointed out hereinafter and set forth in the appended claims forming part of the application.

In the accompanying drawing, a preferred embodiment of the invention is shown by way of illustration and not by way of limitation.

Figure 1:
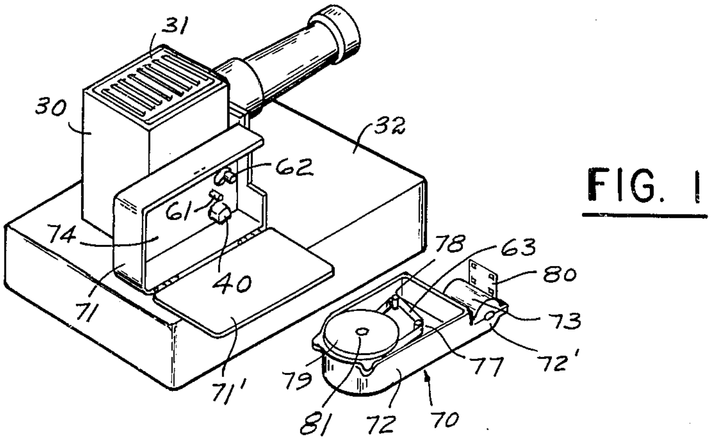
FIG. 1 is a perspective view of a projector and a cartridge according to the invention accommodating the film supply and the record tape.
Figure 2:
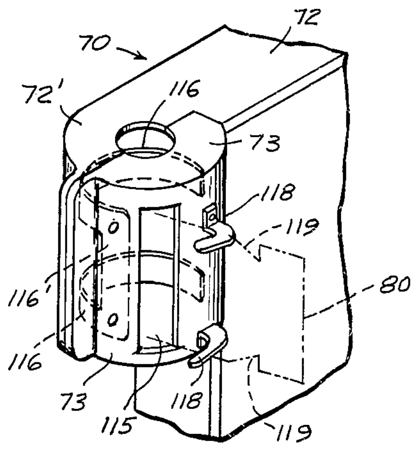
FIG. 2 is a perspective view of the part of the cartridge accommodating the supply of film on an enlarged scale.

Referring now to the figures in detail; the sound projector as exemplified in FIG. 1 comprises the standard components of such a projector, namely projecting means, sound reproducing means, film transport means, drive means for the record tape and attendant control components. All these parts of the projector are mounted in a common casing 30 which, in turn, is mounted on a suitable base 32, which may also be used to house some of the operating equipment of the projector. The overall appearance of the sound projector and its base is shown in FIG. 1, although it should be understood that the configuration of the casing and the base as shown in this figure is intended to be illustrative rather than to show the actual configuration of a marketable product. Casing 30 is shown, by way of illustration only, to be of generally rectangular shape. It is closed at the top by a louvered cover 31.

As has been previously explained, one of the essential features of the invention is to assure that a strip of film bearing a certain sequence of pictures and the tape carrying the messages pertaining thereto are positively associated with each other so as to preclude for all practical purposes any danger of confusion by associating the wrong audible message with a visual message. To accomplish this essential object, a carrier for the record tape and a carrier for the supply of film are structurally united in a cartridge 70 which can be attached to and removed from the casing 30 of the projector only as a unit.

FIG. 1 shows the projector ready to receive a cartridge 70 in an open housing 71 secured to the casing 30 of the projector and shown as being generally rectangular. A capstan 61 and a magnetic sound head 40, which are part of the sound reproducing equipment of the projector, extend into the housing through a side wall 74 thereof. The housing may be closed by a lid 71' after insertion of the cartridge.

The cartridge comprises an open casing 72 made of metal or plastic. The casing has a first portion in which may be fitted upon a spindle 81, a tape spool 79 from the middle of which an endless loop of tape 63 is fed out and into which it is returned near the periphery of the spool, in a manner well known for spools of this kind. The respective end of the first casing portion is curved to match the diameter of spool 79. The tape loop is guided in the casing over two idler pins 77 and 78 mounted on the flat bottom of casing 72. When the cartridge is inserted in the housing 71, the tape will be guided between the capstan 61 and an idler 62 mounted in housing 71 for drive by the capstan.

Figure 3:
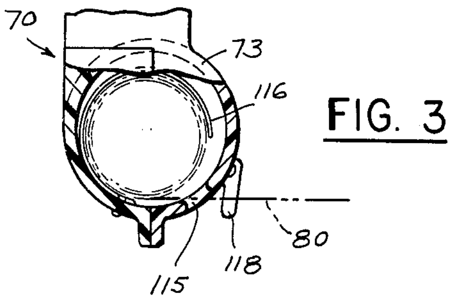
FIG. 3 is a plan view of FIG. 2, partly in section.

The supply of coiled film 80 is housed in a can shaped second portion of casing 72 formed by an extension 72' of casing 72 and a semi-cylindrical cover 73. The film is withdrawn from the can through a longitudinal slot 115. To avoid scuffing of the emulsion side of the film, one or several springy fingers 116 are secured by rivets or other suitable means to an inside wall of the can, two circumferentially curved fingers joined by a strip 116' being shown. As can best be seen in FIG. 3, the fingers hold a supply of film 80 substantially floating within the can.

To protect the film and to facilitate withdrawal of the beginning of the film from the can for insertion in the projecting means of the projector, lugs 118 are provided. These lugs are engageable with notches 119 at the beginning of the film, that is, near the outer end thereof. These lugs, when engaging the notches, retain the end of the film protruding from the slot of the can, thereby preventing the film from slipping entirely into the can.

As is now apparent, all the components of the cartridge are automatically located in the correct position for coaction with the respective components mounted on or in the projector when the cartridge is placed in housing 71. Closing of lid 71' will secure the cartridge in position. Exchange of the cartridge is effected in an equally simple manner by withdrawing the casing 70.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. A self-contained film and tape cartridge for use with a sound projector for projecting successive still pictures formed on a strip of film and simultaneously reproducing messages recorded on magnetic tape, said cartridge comprising a casing operatively attachable to the projector, said casing being divided in a first compartment for accommodating a tape spool and a second compartment for accommodating a coiled supply of film, said first compartment including guide means for guiding successive parts of tape out of and into the spool within said first compartment, and said second compartment being shaped to confine a coiled supply of film inserted therein in position and including a slotted wall portion for withdrawing film from said second compartment, the second compartment having two complementary parts, one of said parts extending from said first compartment and the other constituting a cover attachable to said one part, said cover part including said slotted wall portion.

2. A self-contained film and tape cartridge for use with a sound projector for projecting successive still pictures formed on a strip of film and simultaneously reproducing messages recorded on magnetic tape, said cartridge comprising a casing operatively attachable to the projector, said casing being divided in a first compartment for accommodating a tape spool and a second compartment for accommodating a coiled supply of film, said first compartment having a side wall, a spindle extending from said side wall for rotatably supporting said spool and guide means also extending from the side wall for guiding successive parts of tape out of and into the spool along a predetermined path, said second compartment having a substantially cylindrical configuration to confine therein the coiled supply of film and comprising two generally semi-cylindrical parts, one of said parts extending from the first casing portion and the other part constituting a cover for said one part, said cover part being slotted for withdrawing film from said second compartment.

3. A cartridge according to claim 2 wherein said guide means comprise spaced pins extending from said side wall of the first casing compartment and positioned to guide successive parts of tape along a substantially straight path.

4. A cartridge according to claim 2 wherein said first casing compartment is open at its side opposite said side wall.

5. A cartridge according to claim 2 and comprising at least one springy finger secured at one end to an inner wall of the second casing compartment, said finger extending circumferentially within said compartment to support an inserted coiled supply of film spaced apart from the inner wall of the second casing compartment.

6. A cartridge according to claim 2 wherein a pair of hooks is mounted on the outside wall of said second casing compartment, said hooks being engageable with notches at the end of the film to prevent the same from slipping into the second casing compartment.

7. A projector for projecting successive still pictures formed on a strip of film and for simultaneously producing messages recorded on magnetic tape, said projector including a capstan for driving the tape, a magnetic sound head for reproducing messages recorded on the tape and a receiving receptacle having a side wall and being open at the side opposite said side wall, said capstan and said sound head protruding from said side wall, in combination with a self-contained cartridge for accommodating a tape spool and a coiled supply of film bearing said pictures, said cartridge comprising a casing divided in a first compartment for accommodating the tape spool and a second compartment for accommodating the supply of film, said first compartment including guide means for guiding successive parts of tape out of and into the spool within said first compartment and said second compartment being shaped to confine the coil supply of film therein in a substantially fixed position and including a slotted wall portion for withdrawing film from said second portion, said first casing compartment being inserted in said receptacle for coaction of the guided tape parts with said capstan and said sound head.

8. A projector according to claim 7 wherein a lid is hinged to said receptacle, closing of said lid locking the cartridge within the receptacle.

References Cited by the Examiner

UNITED STATES PATENTS

| | | | |
|---|---|---|---|
| 2,673,500 | 11/50 | Cassidy | 88—17 |
| 2,853,923 | 9/58 | Daniel | 88—28 |

NORTON ANSHER, *Primary Examiner.*

EMIL G. ANDERSON, *Examiner.*